United States Patent
Dhage et al.

(10) Patent No.: US 11,828,529 B2
(45) Date of Patent: *Nov. 28, 2023

(54) APPLIANCE MOUNTING ASSEMBLY

(71) Applicant: WHIRLPOOL CORPORATION, Benton Harbor, MI (US)

(72) Inventors: Atishkumar S. Dhage, Maharashtra (IN); Sanket Vivek Phalak, Maharashtra (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,005

(22) Filed: Apr. 25, 2022

(65) Prior Publication Data
US 2022/0243976 A1 Aug. 4, 2022

Related U.S. Application Data

(63) Continuation of application No. 17/139,086, filed on Dec. 31, 2020, now Pat. No. 11,346,597, which is a continuation of application No. 16/566,486, filed on Sep. 10, 2019, now Pat. No. 10,914,513.

(51) Int. Cl.
  *F25D 25/00* (2006.01)
  *F16B 37/00* (2006.01)

(52) U.S. Cl.
  CPC ............. *F25D 25/00* (2013.01); *F16B 37/00* (2013.01); *F25D 2201/14* (2013.01); *F25D 2323/00* (2013.01)

(58) Field of Classification Search
  CPC .. F25D 25/00; F25D 2201/14; F25D 2323/00; F16B 37/00

USPC ........................................................ 312/408
See application file for complete search history.

(56) References Cited

U.S. PATENT DOCUMENTS

| | | |
|---|---|---|
| 3,747,657 A | 7/1973 | Ryder |
| 3,802,476 A | 4/1974 | Hoadley |
| 4,098,481 A | 7/1978 | Johnson et al. |
| 4,170,391 A | 10/1979 | Bottger |
| 4,190,305 A | 2/1980 | Knight et al. |
| 4,244,637 A | 1/1981 | Boorman, Jr. |
| 4,895,331 A | 1/1990 | Nehls |
| 4,923,260 A | 5/1990 | Poulsen |
| 4,925,350 A | 5/1990 | Kolsett |

(Continued)

*Primary Examiner* — James O Hansen
(74) *Attorney, Agent, or Firm* — Price Heneveld LLP

(57) ABSTRACT

An appliance mounting assembly includes a mounting bracket with first and second distal arms that flare outward in opposing directions from an attachment body and couple to a panel. The mounting bracket includes a pair of coupling members that extend from the attachment body toward the panel surface and distal ends that curve inward toward one another. A self-clinching nut has an undercut, serrated clinching ring, and base. The undercut and the serrated clinching ring are disposed within an aperture defined by the attachment body. A ladder rack has first and second sides coupled via an attachment wall. The first and second sides define protrusions that engage the pair of coupling members in an interference fit. The attachment wall defines a receiving hole that aligns with the aperture. A threaded fastener extends through the receiving hole and engages the self-clinching nut to fasten the ladder rack to the mounting bracket.

13 Claims, 11 Drawing Sheets

(56) References Cited

U.S. PATENT DOCUMENTS

| | | |
|---|---|---|
| 5,154,385 A | 10/1992 | Lindberg et al. |
| 5,692,817 A | 12/1997 | Jun et al. |
| 6,105,794 A | 8/2000 | Bauer |
| 6,612,057 B2 | 9/2003 | Shoemaker et al. |
| 6,827,320 B2 | 12/2004 | Yeh |
| 7,575,212 B1 | 8/2009 | Langelius |
| 8,979,225 B2 | 3/2015 | Eckartsberg et al. |
| 9,010,890 B2 * | 4/2015 | Eckartsberg ......... A47B 57/425 312/408 |
| 2006/0059934 A1 | 3/2006 | Howington et al. |
| 2009/0058248 A1 * | 3/2009 | Gossens ............... A47B 96/061 211/90.02 |
| 2011/0146335 A1 | 6/2011 | Jung et al. |
| 2012/0043874 A1 * | 2/2012 | Simpson ............... F25D 23/067 312/408 |
| 2018/0172339 A1 | 6/2018 | Lindel et al. |
| 2018/0313602 A1 | 11/2018 | Akca et al. |

\* cited by examiner

APPLIANCE MOUNTING ASSEMBLY

CROSS-REFERENCE TO RELATED APPLICATION

The present application is a continuation of U.S. patent application Ser. No. 17/139,086, filed Dec. 31, 2020, now U.S. Pat. No. 11,346,597, entitled APPLIANCE MOUNTING ASSEMBLY, which is a continuation of U.S. patent application Ser. No. 16/566,486 filed Sep. 10, 2019, now U.S. Pat. No. 10,914,513, entitled APPLIANCE MOUNTING ASSEMBLY, the disclosures to which are hereby incorporated herein by reference in their entirety.

BACKGROUND OF THE DISCLOSURE

The present disclosure generally relates to a mounting assembly, and more specifically, to a mounting assembly for an appliance.

SUMMARY OF THE DISCLOSURE

According to one aspect of the present disclosure, an appliance mounting assembly includes a panel having a panel surface. A mounting bracket includes first and second distal arms that flare outward in opposing directions from an attachment body and couple to the panel surface. The mounting bracket includes a pair of coupling members that extend from the attachment body toward the panel surface and includes distal ends that curve inward toward one another. The attachment body defines an aperture. A self-clinching nut has an undercut, a serrated clinching ring, and a base. The undercut and the serrated clinching ring are disposed within the aperture. A ladder rack has first and second sides coupled via an attachment wall. The first and second sides define protrusions that engage the pair of coupling members in an interference fit. The attachment wall defines a receiving hole that aligns with the aperture when in an assembled state. A threaded fastener extends through the receiving hole and engages the self-clinching nut to mechanically fasten the ladder rack to the mounting bracket.

According to another aspect of the present disclosure, a mounting assembly for a vacuum insulated appliance includes a ladder rack having first and second sides coupled via an attachment wall. The attachment wall and the first and second sides define an interior channel. The attachment wall defines a receiving hole. A mounting bracket is disposed within the interior channel of the ladder rack when in an assembled state. The mounting bracket includes an attachment body defining an aperture. The attachment body is disposed adjacent to the attachment wall when in the assembled state. First and second distal arms extend outward from first opposing sides of the attachment body. A pair of coupling members extend from second opposing sides of the attachment body. Each coupling member has proximal and distal ends with a center portion therebetween. A nut is disposed within the aperture. The receiving hole and the aperture align when in the assembled state to receive a fastener that engages with the nut to secure the ladder rack to the mounting bracket.

According to yet another aspect of the present disclosure, a method of assembling an appliance mounting assembly includes providing a first mounting bracket having distal arms that extend outwardly from first opposing ends of an attachment body and a pair of coupling members that extend from second opposing ends of the attachment body. A second mounting bracket is provided having distal arms that extend outwardly from first opposing ends of an attachment body and a pair of coupling members that extend from second opposing ends of the attachment body. Distal flanges of the distal arms of the first mounting bracket are welded on an upper portion of a panel. Distal flanges of the distal arms of the second mounting bracket are welded on a lower portion of the panel spaced-apart and vertically aligned with the first mounting bracket. A nut is positioned within an aperture defined by each of the attachment bodies of the first and second mounting brackets, respectively. A ladder rack is aligned with the first and second mounting brackets. The ladder rack is engaged with the first and second mounting brackets by an interference fit.

These and other features, advantages, and objects of the present disclosure will be further understood and appreciated by those skilled in the art by reference to the following specification, claims, and appended drawings.

Figure 1:
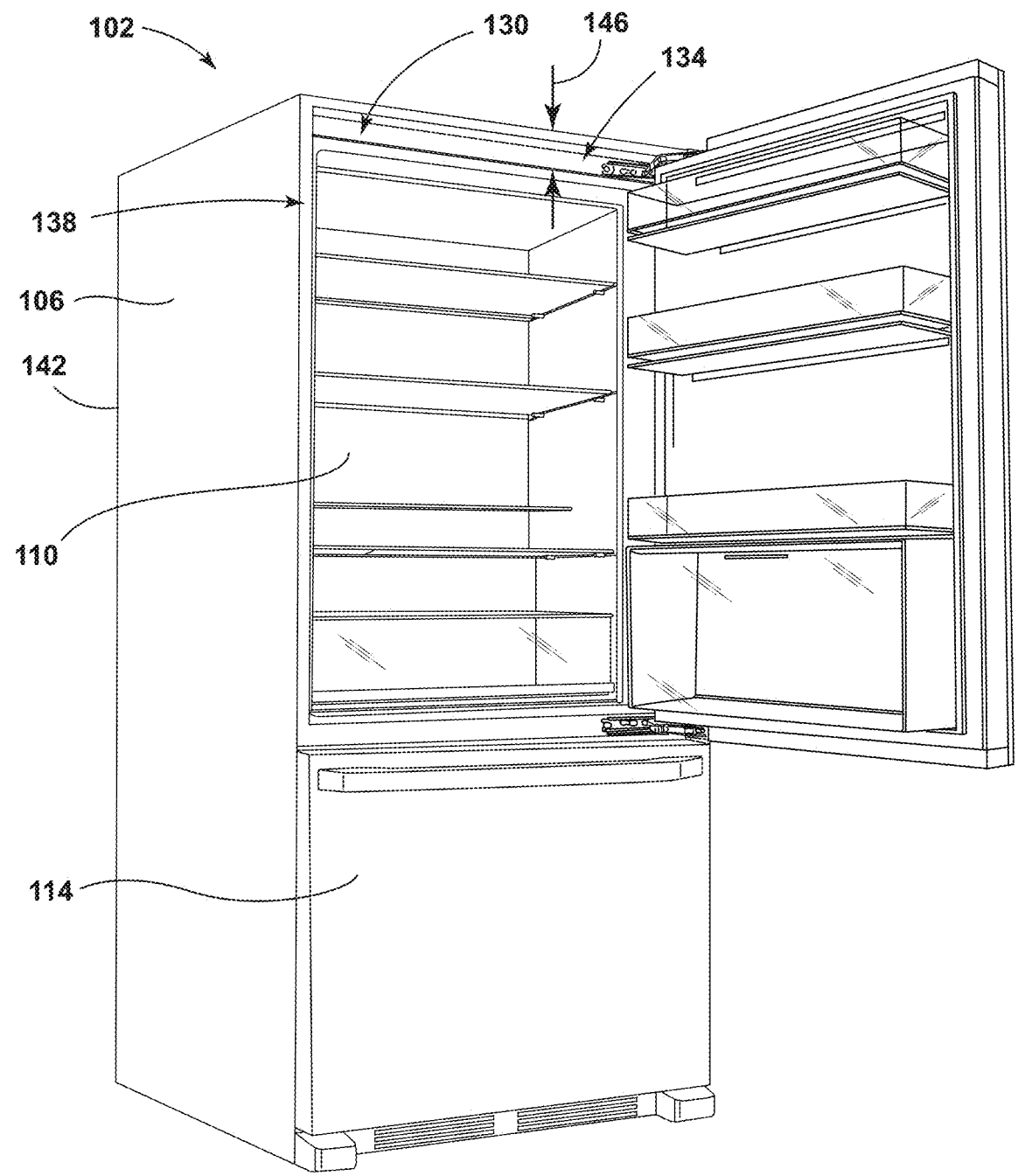
FIG. 1 is a front perspective view of an appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an appliance mounting assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-11, reference numeral 10 generally designates an appliance mounting assembly including a panel 14 having a panel surface 18. A mounting bracket 22 includes first and second distal arms 26, 30 that flare outward in opposing directions from an attachment body 34 and couple to the panel surface 18. The mounting bracket 22 includes a pair of coupling members 38 that extend from the attachment body 34 toward the panel surface 18 and include distal ends 46 that curve inward toward one another. The attachment body 34 defines an aperture 50. A self-clinching nut 54 has an undercut 58, a serrated clinching ring 62, and a base 66. The undercut 58 and the serrated clinching ring 62 are disposed within the aperture 50. A ladder rack 70 has first and second sides 74, 78 coupled via an attachment wall 82. The first and second sides 74, 78 each define protrusions 86 that engage the pair of coupling members 38 in an interference fit. The attachment wall 82 defines a receiving hole 90 that aligns with the aperture 50 when in an assembled state 94. A threaded fastener 98 extends through the receiving hole 90 and engages the self-clinching nut 54 to mechanically fasten the ladder rack 70 to the mounting bracket 22.

Figure 2:
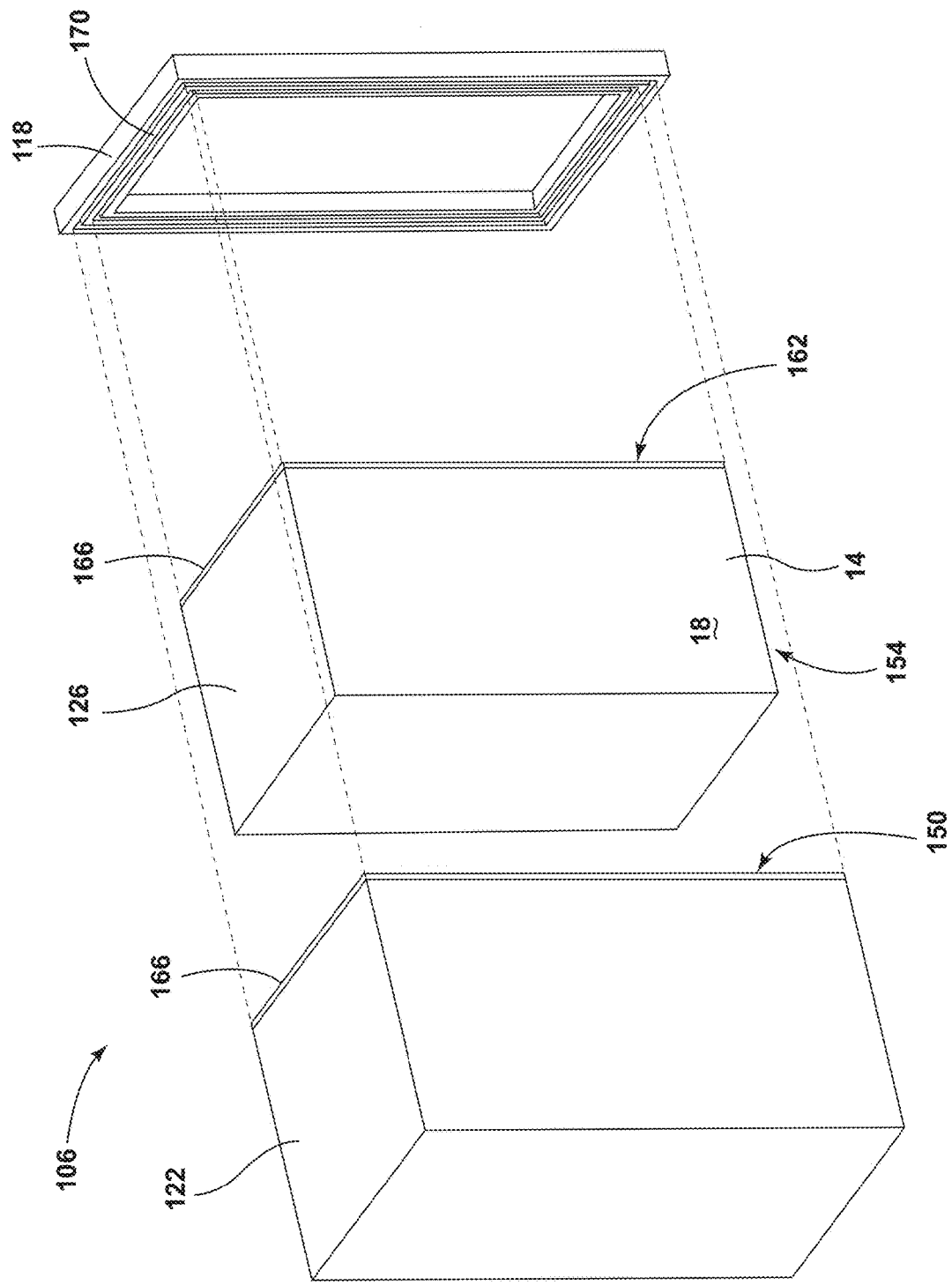
FIG. 2 is an exploded top perspective view of an insulating appliance, according to the present disclosure.

Referring to FIGS. 1 and 2, an appliance 102 is illustrated as a refrigerator having a cabinet 106 defining refrigerator and freezer compartments 110, 114. While illustrated as a bottom mount refrigerator, the appliance 102 may be, for example, a bottom mount French door refrigerator, a top mount refrigerator, a side-by-side refrigerator, a 4-door French door refrigerator, and/or a 5-door French door refrigerator. Further, the present disclosure is not limited to refrigerators. The appliance 102 may be, for example, freezers, coolers, vacuum insulated structures, and other similar appliances and fixtures within household and commercial settings.

The appliance 102 is illustrated in FIGS. 1 and 2 as an insulating appliance 102, which includes a trim breaker 118, a wrapper 122, and a liner 126. The wrapper 122 and liner 126 are coupled to the trim breaker 118 to define an insulating cavity 130 in which one or more insulation materials may be disposed. The insulation materials may be a carbon-based powder and/or silicon oxide-based materials, however, it is generally contemplated that other insulation materials may be used. Additionally, the insulation materials can be free-flowing materials that can be poured, blown, compacted, or otherwise disposed within an insulating cavity 130. This free-flowing material can be in the form of various silica-based materials, such as fumed silica, precipitated silica, nano-sized and/or micro-sized aerogel powder, rice husk ash powder, perlite, glass spheres, hollow glass spheres, cenospheres, diatomaceous earth, combinations thereof, and other similar insulating particulate material. The one or more insulation materials substantially fill the insulating cavity 130 forming a substantially continuous layer between the wrapper 122 and the liner 126. A vacuum 134, or at least a partial vacuum 134, may be defined within the insulating cavity 130, where the vacuum 134 defines a pressure differential 138 between an exterior 142 of the appliance 102 and the insulating cavity 130. This pressure differential 138 serves to define an inward compressive force 146 that is exerted upon both the wrapper 122 and the liner 126 and tends to bias the wrapper 122 and the liner 126 toward the insulating cavity 130 of the appliance 102. The vacuum 134 within the insulating cavity 130 also tends to cause gas to infiltrate into the insulating cavity 130 from an area exterior to the appliance 102. This infiltration of gas is sometimes referred to as gas permeation.

The wrapper 122 and the liner 126 may be configured to form the cabinet 106 of the appliance 102. In this way, the wrapper 122 has a three-dimensional shape and defines a central cavity 150. The liner 126 may correspond with the wrapper 122 and may have a plurality of panels 154, including individual panels 14. Each of the individual panels 14 have the panel surface 18 that defines an inner cavity 162. It is generally contemplated that the liner 126 may be received within the central cavity 150 of the wrapper 122, thus partially defining the insulating cavity 130. Additionally, the wrapper 122 and the liner 126 may include materials capable of at least partially resisting bending, biasing, or otherwise being formed in response to the inward compressive force 146. These materials for wrapper 122 and the liner 126 may include, but are not limited to, metals, plastics, polymers, metal alloys, combinations thereof, and/or other similar substantially rigid materials that can be used for vacuum insulated structures within appliances 102.

It is contemplated that the trim breaker 118 may be coupled to outer edges 166 of the wrapper 122 and the liner 126. As illustrated in FIG. 2, the trim breaker 118 has a generally rectangular shape, however, it is contemplated that other geometric shapes known in the art may be used. In this way, the trim breaker 118 may not substantially interfere with access to the refrigerator and freezer compartments 110, 114 defined by the cabinet 106. A channel 170 may be defined around a perimeter of the trim breaker 118. The channel 170 may be configured to receive the outer edges 166 of wrapper 122 and the liner 126. It is also contemplated that the trim breaker 118 may define more than one channel 170 to accommodate the wrapper 122 and the liner 126 in separate channels 170. The channel 170 may be filled with an adhesive configured to couple the wrapper 122 and the liner 126 with the trim breaker 118.

Figure 3:
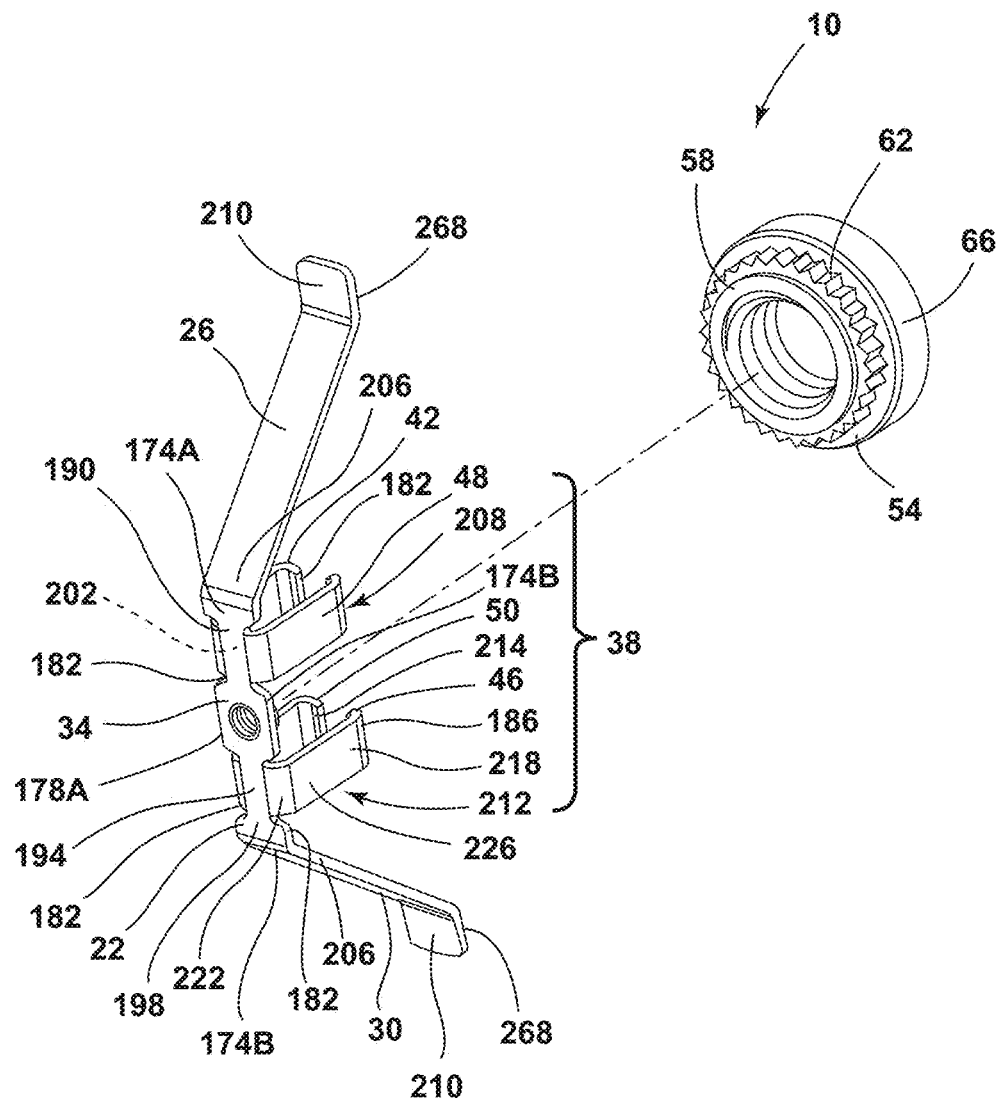
FIG. 3 is an exploded side perspective view of a mounting bracket and a self-clinching nut, according to the present disclosure.

Referring to FIG. 3, the mounting assembly 10 includes the mounting bracket 22 that has the attachment body 34. The attachment body 34 may be generally rectangular or, alternatively any other practicable shape. The attachment body 34 has first opposing sides 174A, 174B, which are illustrated as upper and lower sides. Additionally, the attachment body 34 has second opposing sides 178A, 178B, which are illustrated as lateral sides. The first opposing sides 174A, 174B may be shorter than the second opposing sides 178A, 178B to produce an elongate attachment body 34. In various examples, the second opposing sides 178A, 178B define cutouts 182. As illustrated, the attachment body 34 defines two cutouts 182 on each of the second opposing sides 178A, 178B. The cutouts 182 may be substantially rectangular shaped, as illustrated, or may be any other practicable shape. Due to the cutouts 182, the attachment body 34 may have two widths. The first opposing sides 174A, 174B and a central portion 186 may define a first width, and the cutouts 182 may define a second width less than the first width. It is also contemplated that the cutouts 182 may be different sizes, thereby producing a plurality of widths of the attachment body 34.

According to various aspects, the attachment body 34 defines the aperture 50. As illustrated in FIG. 3, the aperture 50 is defined in the central portion 186 of the attachment body 34. However, depending on the selected configuration of the mounting assembly 10, the aperture 50 may be defined in a first portion 190 of the attachment body 34 proximate one of the first opposing sides 174A, 174B or in a second portion 194 of the attachment body 34 proximate the other of the first opposing sides 174A, 174B. Moreover, it is also contemplated that the attachment body 34 may define more than one aperture 50 depending on the selected configuration of the mounting assembly 10.

Referring still to FIG. 3, the mounting bracket 22 may include the first and second distal arms 26, 30 that flare outward in opposing directions from the attachment body 34. In various examples, the first and second distal arms 26, 30 extend from the first opposing sides 174A, 174B of the attachment body 34, respectively. It is also contemplated that the first and second distal arms 26, 30 may extend from the second opposing sides 178A, 178B of the attachment body 34. In such examples, the first and second distal arms 26, 30 may be coupled to the attachment body 34 within the cutouts 182 or adjacent to the cutouts 182. Additionally or alternatively, the first and second distal arms 26, 30 may extend a substantially similar distance from the attachment body 34.

The first and second distal arms 26, 30 may extend at an angle from the attachment body 34. According to various aspects, the attachment body 34 includes a first surface 198 and a second surface 202. The first and second distal arms 26, 30 may extend away from the attachment body 34 at an acute angle relative to the second surface 202 of the attachment body 34. The acute angle defined between the first distal arm 26 and second surface 202 of the attachment body 34 may be substantially a mirror image of the acute angle defined by the second distal arm 30 and the second surface 202 of the attachment body 34. In this way, the first and second distal arms 26, 30 may extend from the attachment body 34 in a substantially similar manner. This configuration may be advantageous for the first and second distal arms 26, 30 to abut a substantially planar and/or flat surface.

According to various examples, the first and second distal arms 26, 30 may each include a proximal coupling end 206 and distal flanges 210. The proximal coupling ends 206 may couple the first and second distal arms 26, 30 to the attachment body 34. The distal flanges 210 may be defined at an opposing end of the first and second distal arms 26, 30, relative to the proximal coupling ends 206. The distal flanges 210 form a bent end portion to the first and second distal arms 26, 30. The distal flanges 210 extend at obtuse angles relative to the first and second distal arms 26, 30.

Referring still to FIG. 3, the mounting bracket 22 may include the pair of coupling members 38 extending from the second opposing sides 178A, 178B. In this way, the first and second distal arms 26, 30 extend from the first opposing sides 174A, 174B and the pair of coupling members 38 extend from the second opposing sides 178A, 178B. The pair of coupling members 38 includes a first coupling member 42 extending from one of the second opposing sides 178A, 178B and a second coupling member 48 extending from the other of the second opposing sides 178A, 178B. In various examples, the mounting bracket 22 may include a first pair of coupling members 208 having the first and second coupling members 42, 48 and a second pair of coupling members 212 having third and fourth coupling members 214, 218. The third and fourth coupling members 214, 218 may be arranged relative to the attachment body 34 in a similar manner as the first and second coupling members 42, 48.

The first pair of coupling members 208 may be spaced-apart from the second pair of coupling members 212. In various examples, the first pair of coupling members 208 may couple to the first portion 190 of the attachment body 34 and the first pair of coupling members 208 may couple to the second portion 194 of the attachment body 34. The first and second portions 190, 194 of the attachment body 34 may be separated by the aperture 50. In this way, the first and second portions 190, 194 of the attachment body 34 may correspond with opposing sides of the attachment body 34 relative to the aperture 50. According to various aspects, the attachment body 34 may define two opposing cutouts 182 in the first portion 190 and two opposing cutouts 182 in the second portion 194. In such examples, the first and second coupling members 42, 48 may couple to the attachment body 34 within the cutouts 182 defined by the first portion 190 and the third and fourth coupling members 214, 218 may couple to the attachment body 34 within the cutouts 182 defined by the second portion 194.

Referring still to FIG. 3, each of the coupling members 42, 48, 214, 218 includes proximal and distal ends 222, 46 with a center portion 226 therebetween. In various examples, the proximal ends 222 of the coupling members 42, 48, 214, 218 may be coupled to the attachment body 34. The proximal ends 222 may be curved such that at least a portion of the coupling members 42, 48, 214, 218 arcs outward from the attachment body 34. Stated differently, the proximal ends 222 of each of the first and second pairs of coupling members 208, 212 may curve inward toward one another. The center portion 226 may be substantially linear and/or flat. Based on the curve of the proximal ends 222, the center portions 226 of the coupling members 42, 48, 214, 218 may be disposed substantially perpendicular to the attachment body 34, or alternatively, may be obliquely-oriented relative to the attachment body 34. In examples where the center portions 226 are substantially perpendicular, the distal and proximal ends 46, 222 of the coupling members 42, 48, 214, 218 may be in a stacked configuration. In examples where the center portions 226 are obliquely-oriented relative to the attachment body 34, the distal and proximal ends 46, 222 may be offset from one another.

According to various aspects, the distal ends 46 of the first pair of coupling members 208 (e.g., the first and second coupling members 42, 48) curve in toward one another. Similarly, the distal ends 46 of the first pair of coupling members 208 (e.g., the third and fourth coupling members 214, 218) may curve inward toward one another. The curve of the distal ends 46 may be substantially similar to the curve of the proximal ends 222, or alternatively, may be different based on the selected configuration of the mounting bracket 22. It is contemplated that all, some, or none of the distal ends 46 may have the same shape.

In various examples, the first and second pairs of coupling members 208, 212 may extend wider than the first width of the attachment body 34. The distal and proximal ends 46, 222 may both be disposed at a width that is wider than the first width of the attachment body 34. In such configurations, the center portions 226 of the coupling members 42, 48, 214, 218 may be offset from the second opposing sides 178A, 178B of the attachment body 34 to define a width greater than the first width of the attachment body 34. Additionally or alternatively, a proximal width (e.g., a first width) of the first and second pairs of coupling members 208, 212 proximate the proximal ends 222 may be less than a distal width (e.g., a second width) proximate the distal ends 46. In this way, the first and second pairs of coupling members 208, 212 may flare outward from the attachment body 34. Further, the proximal and distal widths may both be wider than the first width of the attachment body 34. Alternatively, the distal width may be wider than the first width of the attachment body 34, but the proximal width may not result in an oblique orientation of the first and second pairs of coupling members 208, 212 relative to the attachment body 34.

Referring still to FIG. 3, the mounting assembly 10 may also include the self-clinching nut 54. The self-clinching nut 54 may include the undercut 58, the serrated clinching ring 62, and the base 66. The undercut 58 and the base 66 may be disposed at opposing ends of the self-clinching nut 54 with the serrated clinching ring 62 therebetween.

Figure 4:
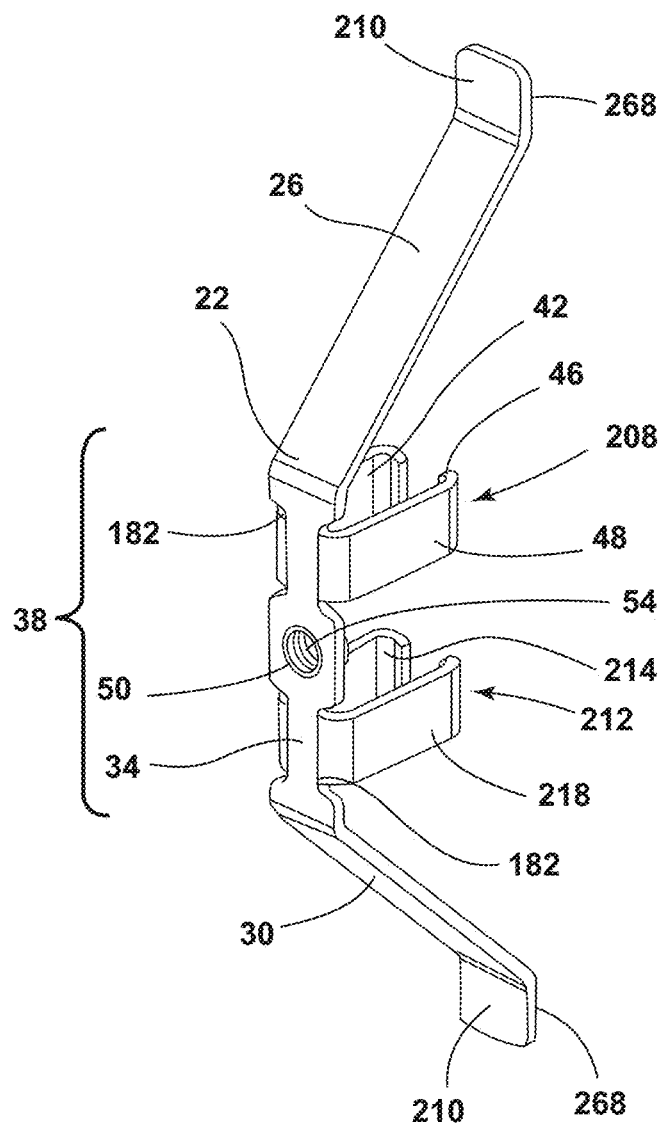
FIG. 4 is a side perspective view of a mounting bracket, according to the present disclosure.

Referring to FIGS. 3 and 4, the self-clinching nut 54 may be disposed within the aperture 50 defined by the attachment body 34 of the mounting bracket 22. In various examples, the undercut 58 and the serrated clinching ring 62 may be disposed within the aperture 50. The base 66 may be disposed proximate to, and/or abut, the second surface 202 of the attachment body 34. In this way, the self-clinching nut 54 may be positioned within the aperture 50 by pressing the self-clinching nut 54 into the aperture 50 from proximate the second surface 202. Use of the self-clinching nut 54 may be advantageous as installation of the self-clinching nut 54 may be completed without additional preparation of the mounting bracket 22, such as, for example, deburring. The self-clinching nut 54 may be permanently installed within the aperture 50. In various aspects, permanent installation may be accomplished by the self-clinching nut 54 swaging the material that surrounds the self-clinching nut 54. In various aspects, the mounting bracket 22 may be formed of metal materials or metal alloy materials, such as for example, aluminum and/or steel. Once the self-clinching nut 54 is disposed within the aperture 50, the materials of the attachment body 34 surrounding the aperture 50 may cold flow into the undercut 58 to integrate the self-clinching nut 54 into the mounting bracket 22. The serrated clinching ring 62 may engage an edge of the attachment body 34 defining the aperture 50 and substantially prevent the self-clinching nut 54 from rotating after installation. Various different types of self-clinching nuts 54 may be used, each with different properties, such as, for example, load-bearing, torque resistance, vibration resistance, etc., based on the selected configuration and/or use of the mounting assembly 10.

Figure 5:
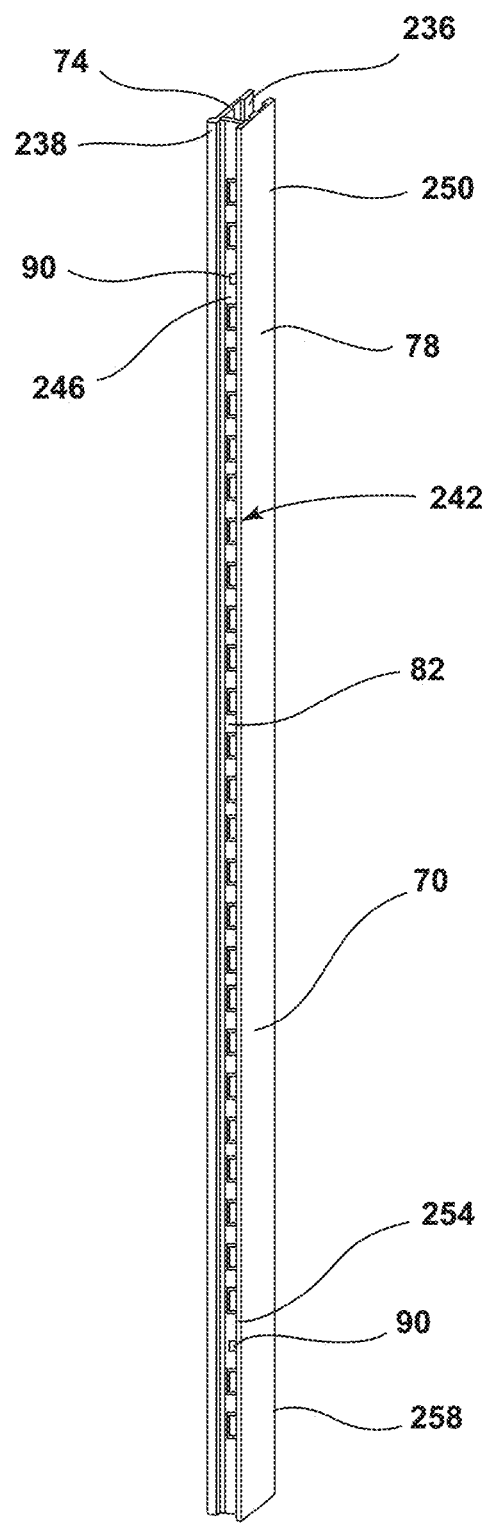
FIG. 5 is a front perspective view of a ladder rack, according to the present disclosure.

Referring to FIG. 5, the ladder rack 70 may include the first and second sides 74, 78 spaced-apart and coupled together via the attachment wall 82. The first and second sides 74, 78 and the attachment wall 82 may define an interior channel 236. In this way, the ladder rack 70 may be substantially U-shaped. In various examples, at least one of the first and second sides 74, 78 defines a rim 238. As illustrated in FIG. 5, the rim 238 extends from the first side 74 of the ladder rack 70. The rim 238 extends outward and away from the attachment wall 82 and the second wall 234. Whether defined by the first side 74 or the second side 78, the rim 238 may extend outwardly and away from the attachment wall 82 to abut an adjacent surface. In this way, the rim 238 may space the first or second sides 74, 78 of the ladder rack 70 from an adjacent surface and/or provide stability for the ladder rack 70.

Figure 6:
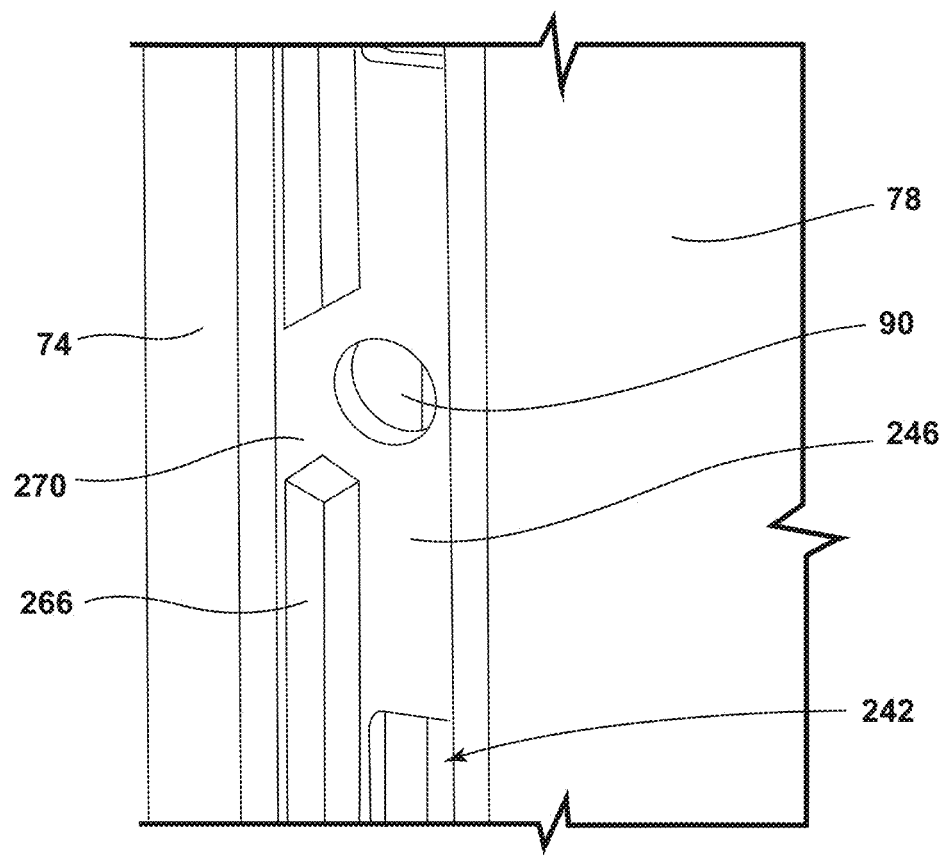
FIG. 6 is an enlarged partial view of a planar surface of a ladder rack, according to the present disclosure.

Referring to FIGS. 5 and 6, the attachment wall 82 may be a single wall or a plurality of walls extending between the first and second sides 74, 78 of the ladder rack 70. In examples where the attachment wall 82 is a single wall, the attachment wall 82 may define more than one opening 242 arranged along all, or at least a portion, of a length of the ladder rack 70. In examples where the attachment wall 82 is configured as a plurality of walls, the plurality of walls may be spaced-apart by the openings 242. The attachment wall 82 of the ladder rack 70 may include a first planar surface 246 disposed in a first end portion 250 of the ladder rack 70 and a second planar surface 254 disposed in a second end portion 258 of the ladder rack 70. As illustrated in FIG. 5, the first end portion 250 may be an upper portion of the ladder rack 70 and the second end portion 258 may be a lower portion of the ladder rack 70. The openings 242 may be defined on one or both sides of the first and/or second planar surfaces 246, 254 such that the first and second planar surfaces 246, 254 may be interruptions in the pattern defined by the openings 242 extending along the ladder rack 70. Each of the first and second planar surfaces 246, 254 may define a receiving hole 90, which may be different in size and/or shape than the openings 242. The receiving holes 90 may be configured to receive the fastener 98, whereas the openings 242 may be configured to receive hooks or other coupling features such as shelves, bins, baskets, panels, etc. within the appliance 102.

Referring still to FIG. 6, the ladder rack 70 may include an inner ridge 266 disposed adjacent to at least one of the first and second sides 74, 78 of the ladder rack 70. The inner ridge 266 may extend adjacent to the attachment wall 82. Additionally or alternatively, the inner ridge 266 may define notches 270 proximate to the first and/or second sides 74, 78 of the ladder rack 70. The first and second planar surfaces 246, 254 of the attachment wall 82 may extend into the notches 270 defined by the inner ridge 266. The inner ridge 266 may provide additional strength to the first and second planar surfaces 246, 254 and/or the ladder rack 70 as a whole.

Figure 7:
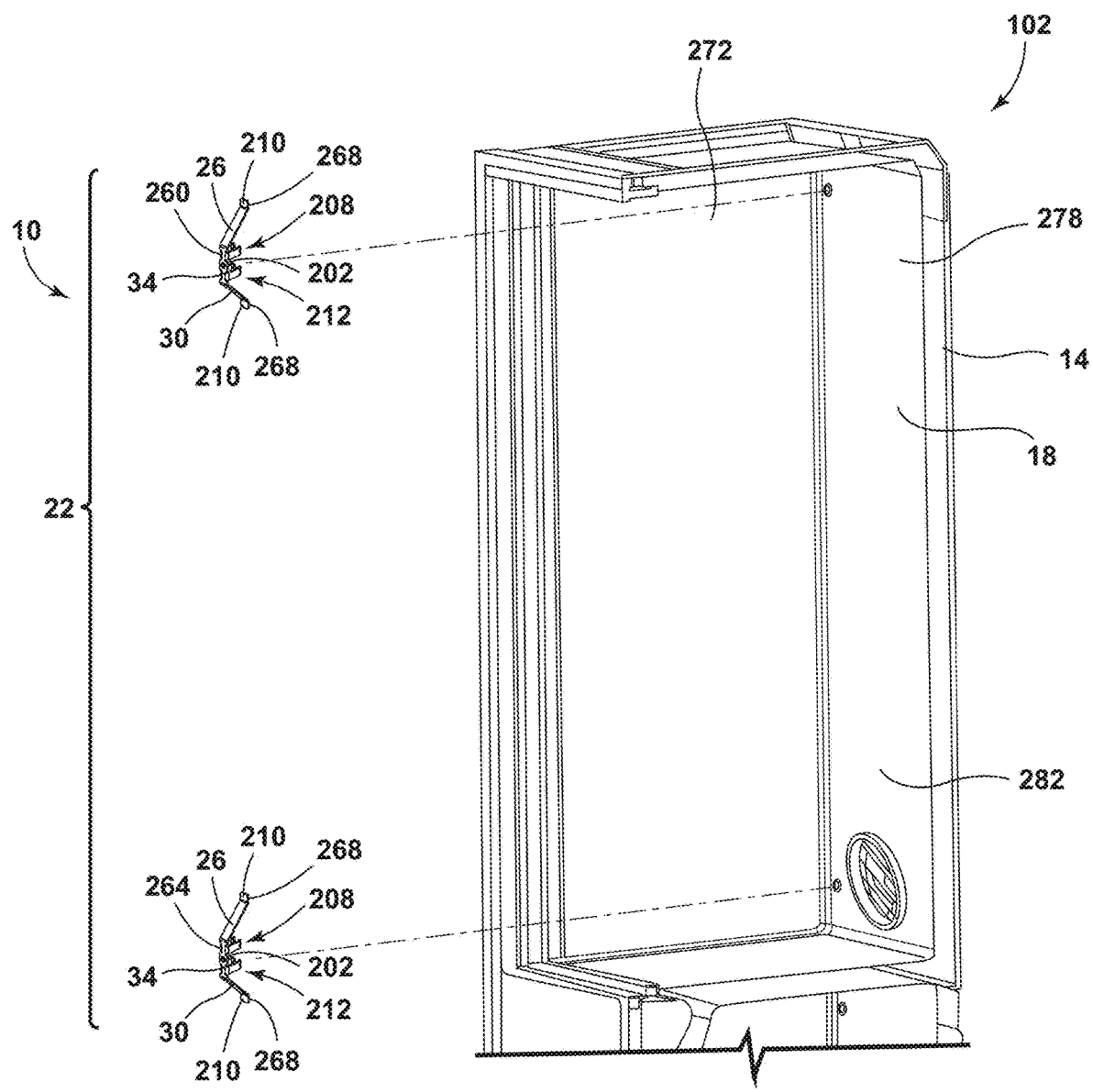
FIG. 7 is a partial exploded view of an appliance with a mounting assembly, according to the present disclosure.
Figure 8:
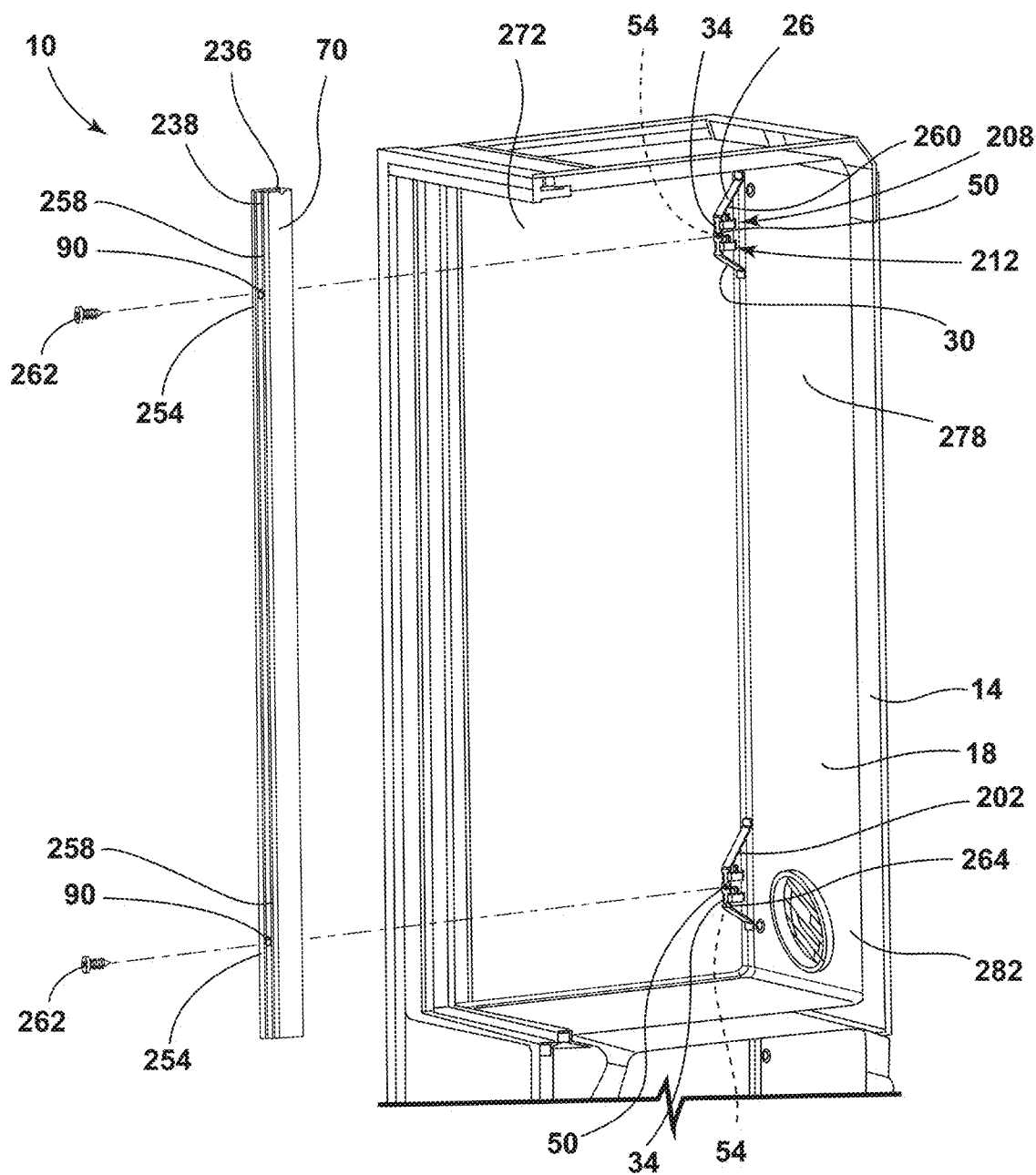
FIG. 8 is a partial exploded view of an appliance with a mounting assembly, according to the present disclosure.
Figure 9:
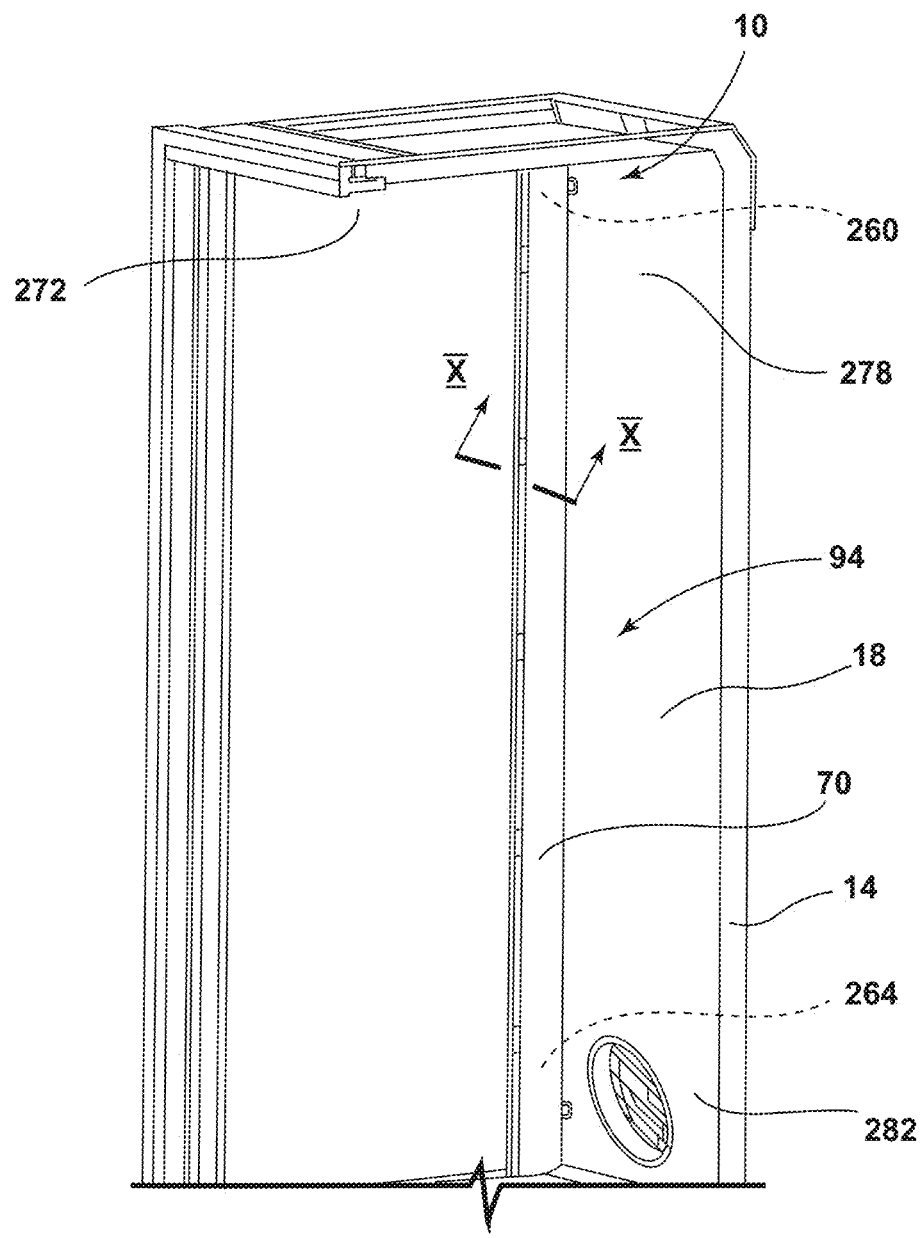
FIG. 9 is a partial exploded view of an appliance with a mounting assembly in an assembled state, according to the present disclosure.

Referring to FIGS. 7-9, the mounting bracket 22 may be coupled to the panel surface 18 of the panel 14 of the appliance 102. According to various aspects, the distal flanges 210 of the first and second distal arms 26, 30 of the mounting bracket 22 each have the abutting surface 268 that abuts the panel surface 18. The distal flanges 210 may be adhered, welded, or otherwise coupled to the panel surface 18. It may be advantageous to weld the distal flanges 210 to the panel surface 18 in vacuum insulated structure examples to maintain the vacuum 134 while supporting other components coupled to the mounting assembly 10.

As previously explained, the attachment body 34 is spaced-apart from the panel surface 18 by the first and second distal arms 26, 30. The first and second distal arms 26, 30 may have substantially similar configurations such that the first and second distal arms 26, 30 are substantially mirror images of one another. This configuration may be advantageous for coupling to a planar panel surface 18. However, in examples where the first and second distal arms 26, 30 abut a non-planar surface, the first and second distal arms 26, 30 may extend at different angles or at different lengths from the attachment body 34. It is also contemplated that the first and second distal arms 26, 30 may abut two adjacent panels disposed at an angle relative to one another.

When the mounting bracket 22 is assembled with the panel 14, the second surface 202 of the attachment body 34 faces the panel surface 18. Moreover, the attachment body 34 is spaced-apart from the panel surface 18 by the first and second distal arms 26, 30 extending at angles therebetween. The first and second pairs of coupling members 208, 212 extend from the attachment body 34 toward the panel surface 18.

As illustrated in FIGS. 7-9, the appliance 102 may include a first mounting bracket 260 and a second mounting bracket 264. The first and second mounting brackets 260, 264 may be spaced-apart from one another and configured in a vertically aligned arrangement. It is also contemplated that the first and second mounting brackets 260, 264 may be rotated relative to the orientation illustrated in FIGS. 7 and 8, and may be in diagonally and/or horizontally aligned arrangements on the panel surface 18. The first and second mounting brackets 260, 264 may be disposed proximate to an adjacent side panel 272 of the appliance 102.

Referring still to FIGS. 7-9, the ladder rack 70 may be disposed over the first and second mounting brackets 260, 264. In this way, the first and second mounting brackets 260, 264 may be disposed within the interior channel 236 of the ladder rack 70 when in the assembled state 94. The first and second planar surfaces 246, 254 of the attachment wall 82 aligns with the attachment body 34 of each of the first and second mounting brackets 260, 264. Further, the first and second planar surfaces 246, 254 may be disposed adjacent to the attachment bodies 34 when the ladder rack 70 is disposed over the first and second mounting brackets 260, 264. Stated differently, the first planar surface 246 may be disposed in the first end portion 250 of the ladder rack 70 and be configured to align with the first mounting bracket 260 and the second planar surfaces 254 may be disposed in the second end portion 258 of the ladder rack 70 and be configured to align with the second mounting bracket 264. The ladder rack 70 is configured to engage the first and second mounting brackets 260, 264 in the interference fit. In various example, the interference fit may be a snap-fit connection. In such examples, the ladder rack 70 may be configured to snap over the first and second mounting brackets 260, 264 to provide the snap-fit connection. The rim 238 of the ladder rack 70 may abut the panel surface 18 of the adjacent side panel 272 of the appliance 102 to provide stability and/or support to the mounting assembly 10. Additionally or alternatively, the rim 238 may assist in aligning the ladder rack 70 within the appliance 102.

According to various aspects, the receiving holes 90 defined in the first and second planar surfaces 246, 254 are configured to align with the apertures 50 of the attachment bodies 34 of the first and second mounting brackets 260, 264 when in the assembled state 94. In this way, the fastener 98 may extend through the receiving holes 90 and engage the self-clinching nuts 54 to mechanically fasten the ladder rack 70 to the first and second mounting brackets 260, 264. The snap-fit connection may be advantageous for securing the ladder rack 70 to the first and second mounting brackets 260, 264 prior to and/or during mechanical fastening of the ladder rack 70 to the first and second mounting brackets 260, 264. In various examples, each of the self-clinching nuts 54 may be threaded and the fastener 98 may be correspondingly threaded. In such examples, the fastener 98 may be a screw, a belt, or a similar threaded coupling member. It is also contemplated that the fastener 98 may not be threaded. Additionally or alternatively, the ladder rack 70 may be retained on the panel 14 by the first and second mounting brackets 260, 264 without the fastener 98 due to the snap-fit connection.

Figure 10:
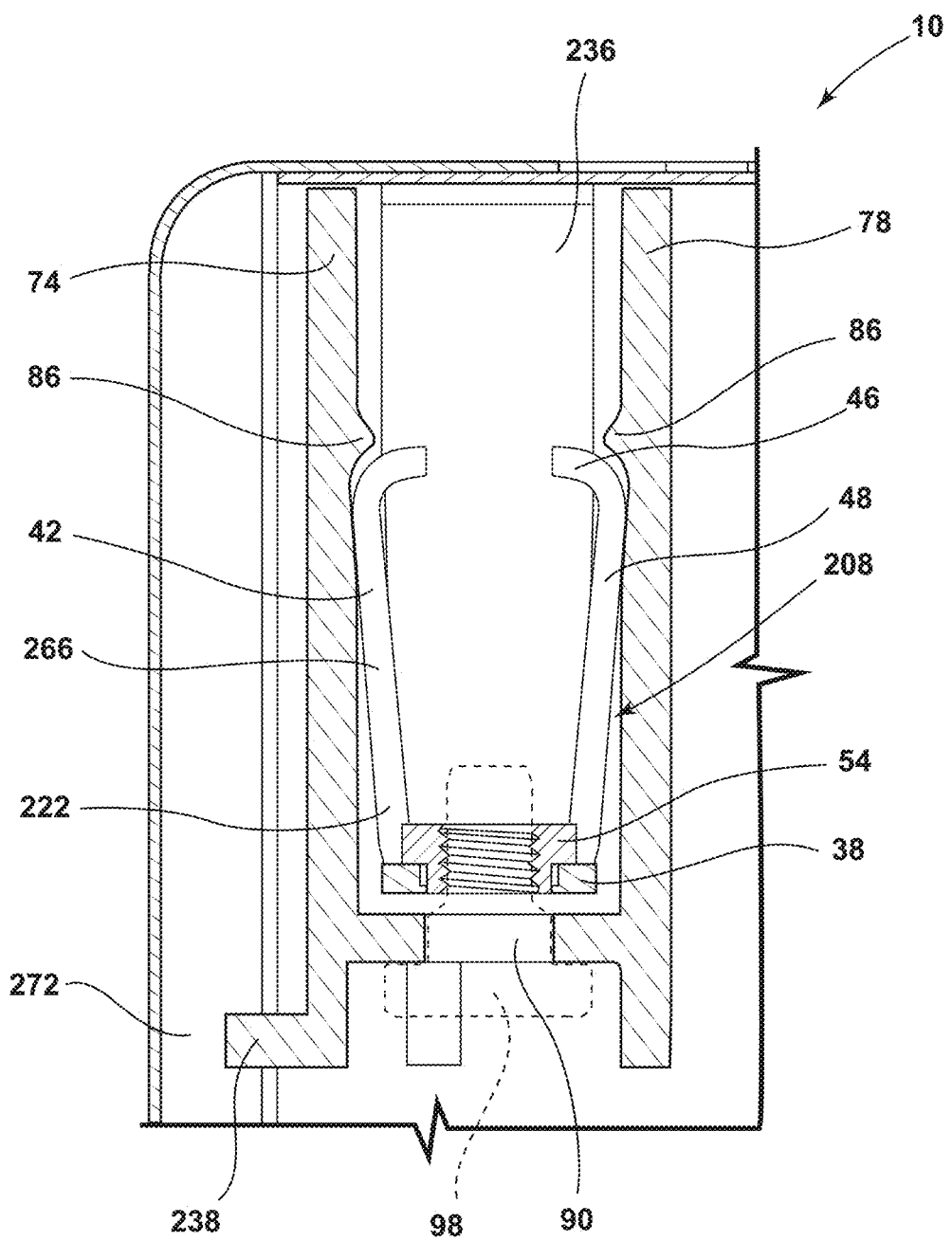
FIG. 10 is a cross-sectional plan view of the mounting assembly of FIG. 9 taken along line X-X.

Referring to FIG. 10, the first pair of coupling members 208 is illustrated engaging the first and second sides 74, 78 of the ladder rack 70. The center portions 226 of the first and second coupling members 42, 48 may be substantially flat to maximize contact with the first and second sides 74, 78 of the ladder rack 70. Additionally or alternatively, the width of the distal ends 46 of the first and second coupling members 42, 48 being greater than the first width of the attachment body 34 may be advantageous for engaging the first and second sides 74, 78 in the snap-fit connection. In various examples, the first and second sides 74, 78 of the ladder rack 70 may each define inwardly extending protrusions 86 that may extend inward toward one another. The ladder rack 70 may define protrusions 86 configured to align with the first and second mounting brackets 260, 264, or alternatively, may define elongate protrusions 86 that extend the length of the ladder rack 70. Additionally or alternatively, the ladder rack 70 may define protrusions 86 along various portions of the ladder rack 70 to provide for different configurations of the mounting assembly 10.

As illustrated, the distal ends 46 of the first and second coupling members 42, 48 engage the protrusions 86 of the ladder rack 70. The curved configuration of the distal ends 46 may provide for self-alignment of the ladder rack 70 over the mounting bracket 22. In this way, the protrusions 86 and the curved distal ends 46 cooperate to centrally align the first and second mounting brackets 260, 264 in the interior channel 236 of the ladder rack 70. The protrusions 86 may also contribute to the snap-fit connection with the first and second mounting brackets 260, 264. The protrusions 86 and the distal ends 46 may couple the ladder rack 70 to the first and second mounting brackets 260, 264 prior to the fastener 98 engaging the self-clinching nut 54. While illustrated as the first pair of coupling members 208, it is contemplated that the second pair of coupling members 212 may be similar arranged and/or constructed.

Figure 11:
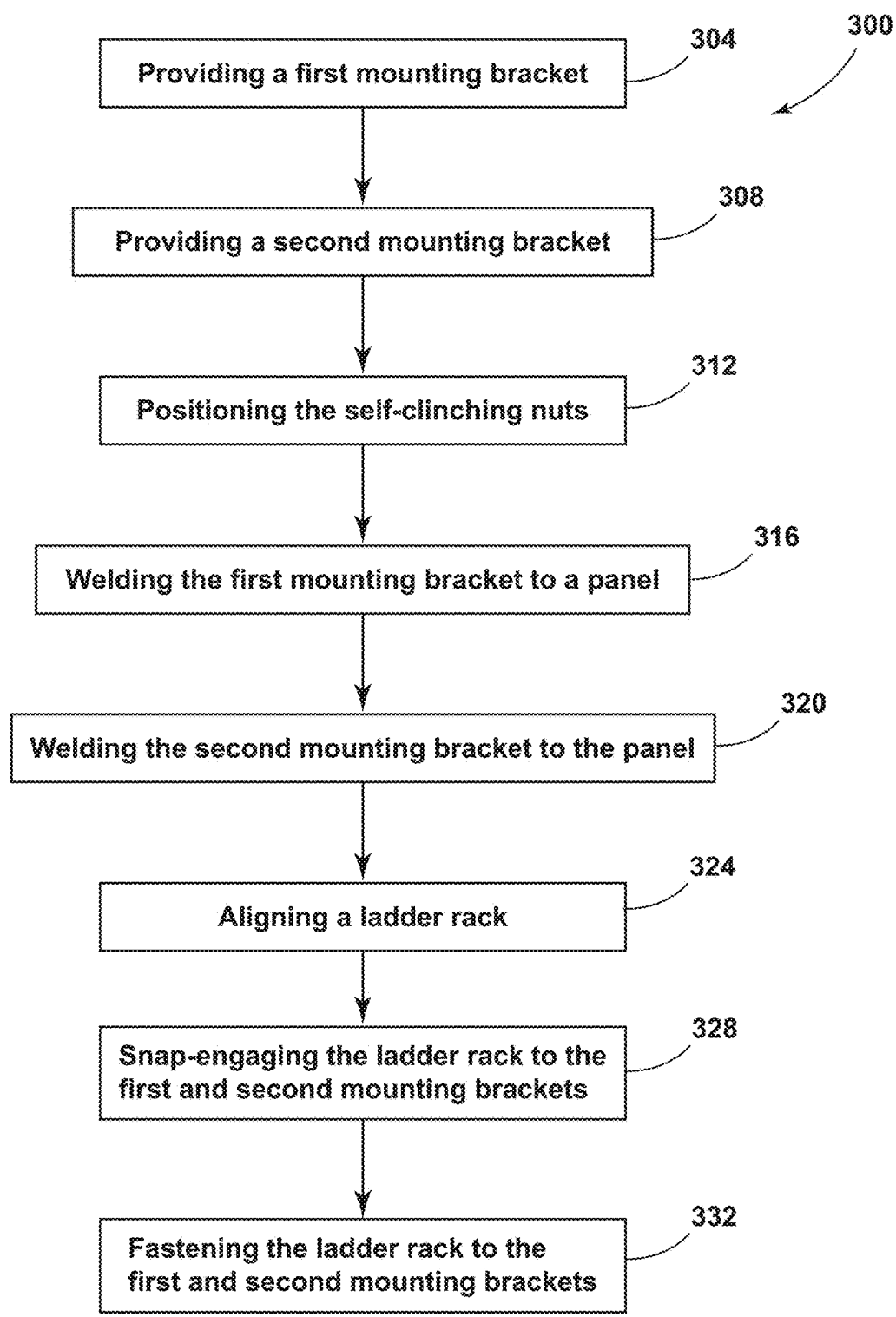
FIG. 11 is a flow diagram of a method of assembling a mounting system within an appliance, according to the present disclosure.

Referring now to FIG. 11, and with further reference to FIGS. 1-10, a method 300 of assembling the mounting assembly 10 includes a step 304 of providing the first mounting bracket 260. The first mounting bracket 260 may include the first and second distal arms 26, 30 extending outwardly from the first opposing sides 174A, 174B of the attachment body 34. Additionally or alternatively, the first mounting bracket 260 may include the first and second pairs of coupling members 208, 212 extending from the second opposing sides 178A, 178B of the attachment body 34. The step 304 may also include providing an appliance 102 or other structure including the panel 14 having the panel surface 18.

A step 308 may include providing the second mounting bracket 264. Similar to the first mounting bracket 260, the second mounting bracket 264 may include the first and second distal arms 26, 30 extending from the first opposing sides 174A, 174B of the attachment body 34. The second mounting bracket 264 may also include the first and second pairs of coupling members 208, 212 extending from the second opposing sides 178A, 178B of the attachment body 34. The second mounting bracket 264 may have a same configuration as the first mounting bracket 260, or alternatively, may have a different configuration depending on the selected use of the mounting assembly 10.

In a step 312, the self-clinching nuts 54 are positioned within the apertures 50 of the first and second mounting brackets 260, 264. In various examples, the self-clinching nuts 54 may be pressed into the apertures 50 from proximate the second surface 202. In this way, the undercuts 58 and the serrated clinching rings 62 may be disposed within the respective apertures 50 and the base 66 may abut the second surfaces 202 of the attachment body 34.

A step 316 may include welding the distal flanges 210 of the first mounting bracket 260 to an upper portion 278 of the panel 14. The first and second distal arms 26, 30 may be vertically aligned with one another. The first mounting brackets 260 may be spaced-apart from the adjacent side panel 272 or other surfaces of the appliance 102 to provide space for the ladder rack 70 to be disposed over the first mounting bracket 260.

Similarly, a step 320 may include welding the distal flanges 210 of the second mounting bracket 264 to a lower portion 282 of the panel 14. The first and second distal arms 26, 30 may be vertically aligned with one another. The second mounting bracket 264 may be spaced-apart from the adjacent side panel 272 or other surfaces of the appliance 102 to provide space for the ladder rack 70. Additionally, the second mounting bracket 264 may be spaced-apart from and vertically aligned with the first mounting bracket 260.

A step 324 may include aligning the ladder rack 70 with the first and second mounting brackets 260, 264. Further, the step 324 may include aligning the first and second planar surfaces 246, 254 of the attachment wall 82 with the attachment body 34 of each of the first and second mounting brackets 260, 264. Moreover, the step 324 may include aligning the protrusions 86 with the first and second pairs of coupling members 208, 212.

A step 328 may include engaging the ladder rack 70 with the first and second mounting brackets 260, 264. This may include pressing the ladder rack 70 over the first and second mounting brackets 260, 264 until the protrusions 86 engage the distal ends 46 of the first and second pairs of coupling members 208, 212 in the interference fit. In various examples, the interference fit may be the snap-fit connection. Moreover, the step 328 may include centering the ladder rack 70 over the first and second mounting brackets 260, 264 such that the first and second mounting brackets 260, 264 are disposed centrally within the interior channel 236 of the ladder rack 70.

A step 332 may include fastening the ladder rack 70 to the first and second mounting brackets 260, 264. In this way, the fastener 98 may extend through the receiving holes 90 in the first and second planar surfaces 246, 254 and engage the self-clinching nuts 54 within the apertures 50 of the first and second mounting brackets 260, 264. The step 332 may be advantageous for securing the ladder rack 70 to the first and second mounting brackets 260, 264, as well as to the panel 14 of the appliance 102.

Use of the present disclosure may provide for a variety of advantages. For example, the snap-fit connection between the ladder rack 70 and the first and second mounting brackets 260, 264 may retain the ladder rack 70 on the first and second mounting brackets 260, 264 without the fastener 98. This may be advantageous for decreasing manufacturing and assembling costs when fastening the ladder rack 70 to the mounting bracket 22. Further, the protrusions 86 may cooperate with the first and second pairs of coupling members 208, 212 to centrally align with the ladder rack 70 over the first and second mounting brackets 260, 264. The snap-fit connection and mechanical fastening of the ladder rack 70 to the first and second mounting brackets 260, 264 may be advantageous for different configurations of the mounting assembly 10 and for removing the ladder rack 70 for servicing purposes. Additionally, the mounting assembly 10 within the appliance 102 may be advantageous for supporting shelves, bins, racks, and other similar structures within the appliance 102 and may do so in a vacuum insulated appliance 102 without compromising the vacuum 134. Additional benefits or advantages of using this device may also be realized and/or achieved.

According to an aspect of the present disclosure, an appliance mounting assembly includes a panel that has a panel surface. A mounting bracket includes first and second distal arms that flare outward in opposing directions from an attachment body and couple to the panel surface. The mounting bracket includes at least one pair of coupling members that extend from the attachment body toward the panel surface and include distal ends that curve inward toward one another. The attachment body defines an aperture. A self-clinching nut has an undercut, a serrated clinching ring, and a base. The undercut and the serrated clinching ring are disposed within the aperture. A ladder rack has first and second sides coupled via an attachment wall. The first and second sides define protrusions that engage the pair of coupling members in an interference fit. The attachment wall defines a receiving hole that aligns with the aperture when in an assembled state. A threaded fastener extends through the receiving hole and engages the self-clinching nut to mechanically fasten the ladder rack to the mounting bracket.

According to another aspect, at least one pair of coupling members includes a first pair of coupling members that extend from opposing sides of a first portion of the attachment body and a second pair of coupling members spaced-apart from the first pair of coupling members and extending from a second portion of the attachment body.

According to another aspect, an attachment body defines cutouts. At least one pair of coupling members are coupled to the attachment body within the cutouts and extend therefrom.

According to still another aspect, an attachment body has a first surface and a second surface oriented toward a panel surface. First and second distal arms each extend at an acute angle relative to the second surface of the attachment body.

According to another aspect, an acute angle defined by a first distal arm and an attachment body is substantially a mirror image of an acute angle defined by a second distal arm and the attachment body.

According to yet another aspect, at least one pair of coupling members extends wider than a width of an attachment body for forming an interference fit with first and second sides of a ladder rack.

According to another aspect, at least one pair of coupling members include proximal ends that curve inward toward one another. Each coupling member of the at least one pair of coupling members includes a substantially flat center portion disposed between the proximal end and the distal end to maximize contact with first and second sides of a ladder rack, respectively.

According to another aspect, first and second distal arms each include a distal flange that has an abutting surface to contact a panel surface.

According to still another aspect, at least one pair of coupling members include proximal ends coupled to an attachment body. A first width of the at least one pair of coupling members proximate the distal ends is greater than a second width proximate the proximal ends.

According to another aspect, at least one of first and second sides of a ladder rack defines a rim extending away from an attachment wall and configured to abut an adjacent side panel surface.

According to yet another aspect, an attachment body is spaced-apart from a panel surface by first and second distal arms that extend at an angle therebetween.

According to an aspect of the present disclosure, a mounting assembly for a vacuum insulated appliance includes a ladder rack with first and second sides coupled via an attachment wall. The attachment wall and the first and second sides define an interior channel. The attachment wall defines a receiving hole. A mounting bracket is disposed within the interior channel of the ladder rack when in an assembled state. The mounting bracket includes an attachment body that defines an aperture. The attachment body is disposed adjacent to the attachment wall when in the assembled state. First and second distal arms extend outward from first opposing sides of the attachment body. At least one pair of coupling members extend from second opposing sides of the attachment body. Each coupling member has proximal and distal ends with a center portion therebetween. A nut is disposed within the aperture. The receiving hole and the aperture align when in the assembled state to receive a fastener that engages with the nut to secure the ladder rack to the mounting bracket.

According to another aspect, at least one pair of coupling members includes a first pair of coupling members that extend from a first portion of the attachment body and a second pair of coupling members that extend from a second portion of the attachment body. The first and second portions correspond with first opposing sides of the attachment body relative to the aperture.

According to still another aspect, distal ends of at least one pair of coupling members are disposed at a width greater than a width of the attachment body to engage first and second sides of a ladder rack in a snap-fit connection.

According to another aspect, first and second sides of a ladder rack define inwardly extending protrusions that engage distal ends of at least one pair of coupling members in a snap-fit connection when in an assembled state.

According to yet another aspect, an attachment wall includes a planar surface that defines a receiving hole and is disposed adjacent to the attachment body when in an assembled state. The attachment wall defines more than one opening on each side of the planar surface.

According to another aspect, center portions of each coupling member of the at least one pair of coupling members are disposed offset from second opposing sides of the attachment body to define a width greater than a width of the attachment body.

According to still another aspect, distal ends of the at least one pair of coupling members curve inward toward one another and are configured to engage protrusions of a ladder rack and align the ladder rack over a mounting bracket.

According to an aspect of the present disclosure, a method of assembling an appliance mounting assembly includes providing a first mounting bracket having distal arms that extend outwardly from first opposing ends of an attachment body and a pair of coupling members that extend from second opposing ends of the attachment body. A second mounting bracket is provided having distal arms that extend outwardly from first opposing ends of an attachment body and a pair of coupling members that extend from second opposing ends of the attachment body. Distal flanges of the distal arms of the first mounting bracket are welded on an upper portion of a panel. Distal flanges of the distal arms of the second mounting bracket are welded on a lower portion of the panel spaced-apart and vertically aligned with the first mounting bracket. A nut is positioned within an aperture defined by each of the attachment bodies of the first and second mounting brackets, respectively. A ladder rack is aligned with the first and second mounting brackets. The ladder rack is engaged with the first and second mounting brackets by an interference fit.

According to another aspect, a ladder rack is fastened to the first and second mounting brackets via a fastener and a nut.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A method of installing a mounting assembly in a vacuum insulated appliance, comprising:
   providing at least one mounting bracket;
   positioning a self-clinching nut at least partially within an aperture defined by the at least one mounting bracket including positioning a serrated clinching ring of the self-clinching nut within the aperture, wherein a base of the self-clinching nut abuts a surface of the at least one mounting bracket proximate the aperture;

welding the at least one mounting bracket on a panel surface of said vacuum insulated appliance;

engaging a ladder rack with the at least one mounting bracket, wherein protrusions of the ladder rack engage coupling arms of the at least one mounting bracket; and fastening the ladder rack to the at least one mounting bracket with a fastener engaging the self-clinching nut.

2. The method of claim 1, wherein the at least one mounting bracket includes a first mounting bracket and a second mounting bracket, and wherein the step of welding includes welding the first mounting bracket to the panel surface and welding the second mounting bracket to the panel surface spaced from the first mounting bracket.

3. The method of claim 2, wherein the step of welding includes vertically aligning the first mounting bracket with the second mounting bracket.

4. The method of claim 1, wherein the step of welding includes vertically aligning distal arms of the at least one mounting bracket.

5. The method of claim 1, further comprising:
positioning the at least one mounting bracket on a support panel to be spaced from an adjacent panel of said vacuum insulated appliance, wherein the support panel and the adjacent panel are configured to at least partially form a liner of said vacuum insulated appliance.

6. The method of claim 1, wherein the step of fastening the ladder rack includes inserting the fastener through an opening defined by the ladder rack to engage the self-clinching nut.

7. The method of claim 1, further comprising:
integrating the self-clinching nut into the at least one mounting bracket with a material of the at least one mounting bracket flowing into an undercut of the self-clinching nut.

8. The method of claim 1, further comprising:
providing a cabinet having a liner coupled to a wrapper via a trim breaker to define an insulating cavity within the cabinet.

9. The method of claim 8, further comprising:
defining an at least partial vacuum within the insulating cavity.

10. The method of claim 8, further comprising:
positioning the at least one mounting bracket with the self-clinching nut against the panel surface, wherein the base abuts the surface of the at least one mounting bracket that is oriented toward the panel surface.

11. The method of claim 1, wherein the step of welding includes positioning distal arms of the at least one mounting bracket on the panel surface with an attachment body of the at least one mounting bracket spaced from the panel surface, the coupling arms extending from the attachment body toward the panel surface.

12. The method of claim 11, wherein the step of engaging the ladder rack includes positioning sides of the ladder rack on opposing sides of the attachment body.

13. The method of claim 1, wherein the at least one mounting bracket includes a first mounting bracket and a second mounting bracket, and wherein the step of engaging the ladder rack includes centering the ladder rack over the first and second mounting brackets for the first and second mounting brackets to be centrally disposed within an interior channel of the ladder rack.

* * * * *